Patented May 17, 1949

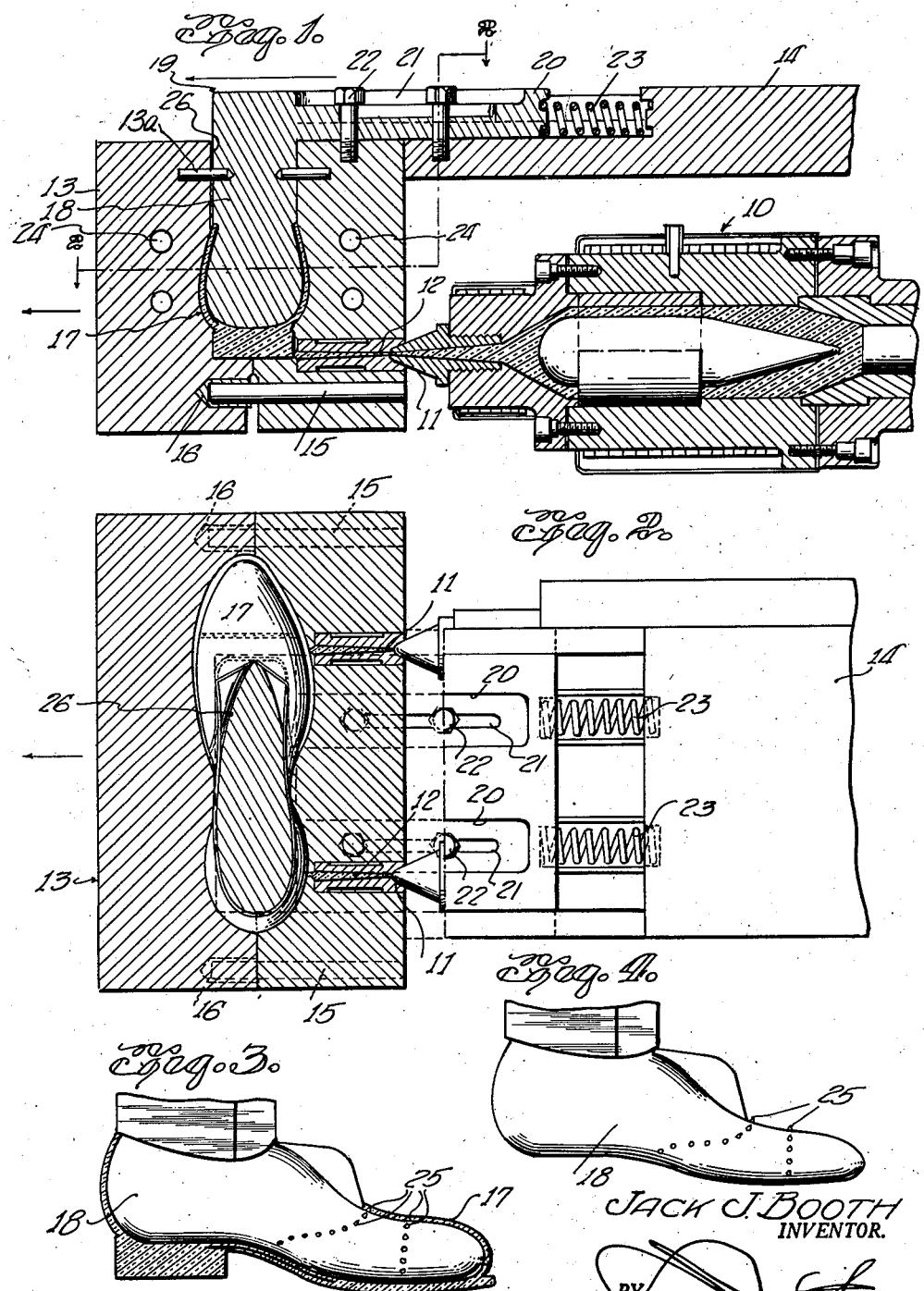

2,470,089

UNITED STATES PATENT OFFICE 2,470,089

METHOD OF MOLDING PLASTIC SHOES

Jack J. Booth, Dallas, Tex.

Application September 28, 1944, Serial No. 556,183

3 Claims. (Cl. 18—59)

This invention relates to the shoemaking art and has as its principal object to provide a method of forming a shoe formed or molded of a suitable plastic material or materials in a single piece or unitary structure, possessing desirable texture, plasticity, flexibility, color and finish.

To attain these desirable characteristics in such an article of manufacture the invention provides a method wherein a mold of suitable design, permitting of the introduction thereinto at suitable places of the requisite quantities of materials, which will unite and bond into a finished, one piece shoe, as the molding and curing processes are developed, the finished product to possess the desired characteristics indicated.

Novelty is not claimed herein for the injection or other apparatus for loading or injecting the materials into the mold, since conventional structure may be employed, and such are shown in the accompanying drawings.

Steps in the process are pointed out in the following description together with the accompanying drawings, in which:

Figure 1 is a schematic, end view of a mold and injection apparatus in vertical section.

Figure 2 is a plan view, partly in section, taken on line 2—2 of Figure 1.

Figure 3 is a side elevation of the inner mold form showing section of shoe thereon, and Figure 4 is a side elevation of the inner mold form per se.

In the several views, like references indicate similar elements, in which 10 is a conventional apparatus for injecting plastic material at desired temperatures and suitable pressures through ports or nozzles 11 into suitable receiving ports 12 of my mold 13, while 14 is a structure for supporting mold 13 in such a manner that when the mold is brought into operating relation with the injection apparatus 10 the discharge nozzles 11 will be brought into sealed registry with receiving ports 12 of the mold. Any suitable means, such as a hydraulic ram or pressure apparatus (not shown), may be used to bring and retain the mold and injection apparatus into operative relation. One part of the outer mold 13 is rigidly attached to support 14 and the other part is guided into operative position by guide pins 15 received by openings 16 in respective parts of the outermold 13. The outer mold 13 is provided with a cavity 17 in the form of the outer surface of the shoe to presently be molded and is adapted to receive the inner form 18 in the shape of the inner surface of the desired shoe to be formed. Inner form 18 is provided with a shank 19 and an extension 20 for retaining the respective mold parts in desired relation during necessary manipulation, to facilitate which extension 20 is provided with slotted openings 21 for receiving studs 22 threadedly engaging support 14. The mold parts 13 are provided with guide and retaining pins 13a to be received by suitable openings in the shank 19 of the inner form 18 as the assembled mold is brought into position. The space or cavity thus secured is the exact shape and form to provide the desired thickness of the finished shoe in all its parts. To further facilitate manipulation of the parts, compression springs 23 are operatively positioned between support 14 and extension 20 so as to be compressed, as parts of outer mold 13 are brought together about the inner mold 18 and operatively with the injection apparatus and exert a pressure tending to effect separation of the parts of mold 13, as the molding cycle is completed. For maintaining desired working temperatures in the molds they are, or may be provided, with openings 24 for suitable media to be circulated by conventional means, which media are employed at temperatures necessary to effect proper temperature control in the molds.

The mold 18 may be provided with projections 25, which may be used as spacers for the mold parts, and to create desired artistic designs on the finished shoe, as well as ventilation openings at desired positions in the shoe structure.

Space at the juncture of the mold parts usually will be found adequate for escape of entrapped air from the mold cavity. However auxiliary openings 26 are provided when desired to facilitate the flow of materials being introduced into the mold.

While only two openings 12 are shown for receiving the material into the mold, it is obvious that any number may be provided to effect proper flow of materials of desired or varied texture, plasticity, porosity, color or the like to make a completed shoe having all desired characteristics. The operation of forming a shoe is readily performed by closing the mold and inducing the proper temperature by means of the circulating medium and bringing the molds into position to receive the plastic materials of the desired consistency, color, etc. and of proper quantities, and at the proper number and positions from the injection apparatus to form the shoe, and maintaining these materials in the mold for such period or cycle of time, and at temperatures and pressures required to secure the bonding and curing thereof into a shoe of one piece. It will be readily understood by those skilled in the art that as materials vary in characteristics or properties, adjustments and variations of the several details of the apparatus may be required to effect the desired results. These variations may include temperatures, pressures, number and location of introduction points for the material as well as escape vents for air and overflow of material and time cycle of operations.

While I have shown apparatus employing the injection method of introducing the plastic material into the mold cavity, I may load the mold by hand, before bringing the parts together by suitable pressure media and then retain the closed position for the required time cycle, pressure and temperatures required. Other factors are so similar to those outlined as to require no further elaboration.

It will readily occur to those skilled in the art that reinforcings or inserts such as in the arch heel or toe, may be incorporated in the shoe by positioning these elements in the mold cavity so that the material flows about them in the manner desired and cures with such elements in place.

Also the desired finish or design may be provided an any part of the shoe by the finish or design of the corresponding mold surface.

When the molding operation is completed the pressure is released on the parts of the outer mold 13 and the compressed springs 23 urge the mold 18 and a part of the mold 13 away from the other part of the mold 13, thus exposing a portion of the finished shoe. The remaining portion of the mold 13 is then removed and the finished plastic shoes manipulated off of its inner form 18 by hand or other suitable means.

Most materials suitable for manufacture of plastic shoes will possess sufficient elasticity to permit of ready removal from the mold 18 and projections 25. Where other materials are used I may provide a collapsible inner mold or provide for retractible projections 25 to facilitate removal of the finished shoe from the mold.

Manifestly, the construction as shown and described is capable of some modification and such modification as may be construed to fall within the scope and meaning of the appended claims is also considered to be within the spirit and intent of the invention.

What I claim is:

1. The method of forming a shoe having a combined and integral sole, heel, and upper, which consists of introducing into a mold at separate points quantities of plastic materials possessing varying characteristics but possessing the common property of uniting together and of molding the plastic into an unitary shoe structure including said sole, heel and upper; and forming openings in said upper at predetermined points during the forming operation.

2. In a method as set forth in claim 1, said mold having a greater width cavity throughout the sole forming portion, whereby the sole will be thicker than the upper, and will possess less flexibility.

3. In a method as set forth in claim 1, introducing into the parts of the cavity of the mold plastic material of different colors, whereby parts of the shoe will have colors different from other parts.

JACK J. BOOTH.

REFERENCES CITED

The following references are of record in the file of this patent:

UNITED STATES PATENTS

| Number | Name | Date |
|---|---|---|
| 12,144 | Tyer et al. | Jan. 2, 1855 |
| 1,567,479 | Wilhelmi | Dec. 29, 1925 |
| 2,033,935 | Griffith | Mar. 17, 1936 |
| 2,068,239 | Malm | Jan. 19, 1937 |
| 2,129,607 | Schott | Sept. 6, 1938 |
| 2,199,144 | Tegarty | Apr. 30, 1940 |
| 2,296,296 | Shaw | Sept. 22, 1942 |
| 2,331,963 | Da Cunha | Oct. 19, 1943 |
| 2,337,550 | Crosby | Dec. 28, 1943 |

FOREIGN PATENTS

| Number | Country | Date |
|---|---|---|
| 261,005 | Great Britain | Feb. 6, 1928 |